(12) United States Patent
MacFarlane

(10) Patent No.: US 9,494,232 B2
(45) Date of Patent: Nov. 15, 2016

(54) METHOD AND APPARATUS FOR MONITORING A TRANSMISSION RANGE SELECTOR

(71) Applicant: GM GLOBAL TECHNOLOGY OPERATIONS LLC, Detroit, MI (US)

(72) Inventor: Brian A. MacFarlane, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 94 days.

(21) Appl. No.: 14/591,042

(22) Filed: Jan. 7, 2015

(65) Prior Publication Data
US 2016/0195187 A1  Jul. 7, 2016

(51) Int. Cl.
| F16H 61/12 | (2010.01) |
| F16H 59/08 | (2006.01) |
| F16H 59/68 | (2006.01) |
| F16H 59/14 | (2006.01) |
| F16H 59/46 | (2006.01) |
| F16H 59/40 | (2006.01) |

(52) U.S. Cl.
CPC .............. *F16H 61/12* (2013.01); *F16H 59/08* (2013.01); *F16H 59/14* (2013.01); *F16H 59/40* (2013.01); *F16H 59/46* (2013.01); *F16H 59/68* (2013.01); *F16H 2059/148* (2013.01); *F16H 2059/465* (2013.01); *F16H 2059/683* (2013.01); *F16H 2059/6807* (2013.01); *F16H 2061/1208* (2013.01)

(58) Field of Classification Search
None
See application file for complete search history.

(56) References Cited

U.S. PATENT DOCUMENTS

| 6,026,342 A * | 2/2000 | Graf ...................... B60W 10/06 477/107 |
| 6,375,591 B1* | 4/2002 | Wakahara ............... F16H 61/12 475/119 |
| 6,880,419 B2 | 4/2005 | Berger et al. |
| 7,270,027 B2 | 9/2007 | Berger et al. |
| 7,934,590 B2 | 5/2011 | Duhaime et al. |
| 8,004,275 B2 | 8/2011 | Wang et al. |
| 2007/0049457 A1* | 3/2007 | Sato ........................ F16H 61/12 477/97 |
| 2009/0112420 A1 | 4/2009 | Buur et al. |
| 2009/0199670 A1 | 8/2009 | Ruebsam et al. |
| 2009/0298645 A1* | 12/2009 | Wang .................... B60W 10/06 477/111 |
| 2010/0060577 A1 | 3/2010 | Wang |

* cited by examiner

*Primary Examiner* — Edwin A Young
(74) *Attorney, Agent, or Firm* — Quinn Law Group, PLLC

(57) ABSTRACT

A method for monitoring a transmission range selector connected to a transmission of a powertrain system is described. The transmission range selector indicates one of a plurality of ranges including Park, Reverse, Neutral, and Drive. The method includes, upon detecting a change in a target transmission range, monitoring whether a signal output from an on-board sensor indicates an achieved range position of the transmission. When the signal output from the on-board sensor does not indicate that the target transmission range has been achieved, monitoring a transmission incorrect direction metric, monitoring a transmission unintended propulsion metric, and monitoring a metric associated with achieving the target transmission range. A fault is detected when any one of the transmission incorrect direction metric, the transmission unintended propulsion metric and the target range achievement elapsed time metric is exceeded.

15 Claims, 1 Drawing Sheet

METHOD AND APPARATUS FOR MONITORING A TRANSMISSION RANGE SELECTOR

TECHNICAL FIELD

This disclosure relates to vehicle transmission devices, including methods and systems associated with transmission range selection.

BACKGROUND

Powertrain systems, such as those employed on vehicles, include prime movers that generate mechanical power in the form of torque and speed that is transferred through a transmission to a driveline. A driveline can include rotatable wheels that generate tractive power for propulsion. An operator employs an interface device, e.g., a range selector, to select a desired transmission range for operation, which can include Park, Reverse, Neutral, Drive and other known ranges. A transmission includes some form of controller that includes electric, electronic, electro-mechanical, hydraulic and other components and systems that controls operation of the transmission, including shifting between operator-selected ranges and automatically shifting between fixed-gear ratios. This can include controlling operation in one of a plurality of fixed-ratio gears in response to a predetermined calibration based upon an operator torque request, engine speed and load, and other factors. A range selector can be controllably linked to the controller via mechanical means or via electrical and/or electronic signals. The latter linkage is often referred to as a "shift-by-wire" configuration.

SUMMARY

A method for monitoring a transmission range selector connected to a transmission of a powertrain system is described. The transmission range selector indicates one of a plurality of ranges including Park, Reverse, Neutral, and Drive. The method includes, upon detecting a change in a target transmission range, monitoring whether a signal output from an on-board sensor indicates an achieved range position of the transmission. When the signal output from the on-board sensor does not indicate that the target transmission range has been achieved, monitoring a transmission incorrect direction metric, monitoring a transmission unintended propulsion metric, and monitoring a metric associated with achieving the target transmission range. A fault is detected when any one of the transmission incorrect direction metric, the transmission unintended propulsion metric and the target range achievement elapsed time metric is exceeded.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
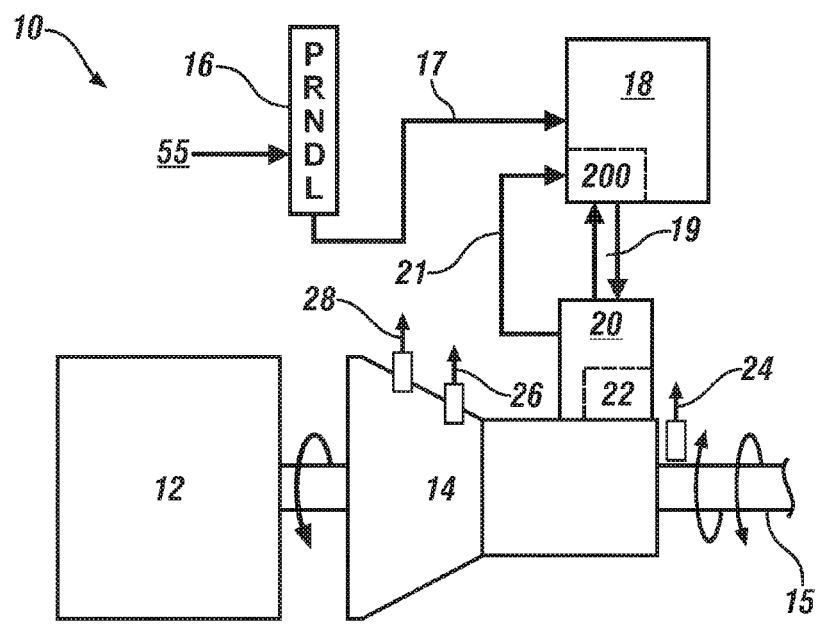
FIG. 1 schematically shows a powertrain system including a prime mover coupled to a transmission device controlled by a controller, in accordance with the disclosure.

Referring now to the drawings, wherein the depictions are for the purpose of illustrating certain exemplary embodiments only and not for the purpose of limiting the same, FIG. 1 schematically illustrates a powertrain system 10 including a prime mover 12 coupled to a torque transmission device (transmission) 14 controlled by a transmission controller (TCM) 18. The prime mover 12 is an internal combustion engine in one embodiment, but can be any suitable torque generating device or combinations of torque-generating devices that transfer mechanical power to the transmission 14. The transmission 14 is a stepped-gear device in one embodiment, and can be an electrically-variable hybrid transmission or any other suitable transmission. The prime mover 12 generates torque that is transferred through the transmission 14 at a selectable gear ratio to a driveline that can include one or more tractive wheels of a vehicle in one embodiment to effect vehicle propulsion. The transmission 14 includes a rotatable output member 15 that couples to the driveline that can rotate in either a first, nominally forward direction or a second, nominally reverse direction. Other powertrain components and systems, e.g., torque converters, may be employed.

A transmission range selector 16 connects to the TCM 18, and is an operator-controllable device that enables an operator to select one of a plurality of positions associated with transmission ranges that include direction of vehicle travel and desired propulsion state. The transmission range selector 16 can include, by way of example, a lever, a switch, a dial, a push-button or any other suitable device. Transmission ranges are operator-selectable and can include Park, Reverse, Neutral and Drive (PRND) and/or other selectable transmission ranges. The transmission range selector 16 can include other operator-selectable states or commands, including, by way of example, manual downshifts and tap-up/tap-down shifts. The transmission range selector 16 communicates a PRND signal 17 to the TCM 18 indicating an operator-selected transmission range 55. The TCM 18 communicates a shift signal 19 to an electronic transmission range selection (ETRS) system 20, which effects shifting the transmission 14 to the selected transmission range in response to the PRND signal 17. A transmission range mode valve position sensor 22 of the ETRS system 20 monitors a transmission range mode valve, which may be a main valve that controls hydraulic flow to transmission clutches to provide master control of range availability. The transmission range mode valve position sensor 22 monitors range position of the transmission 14 and provides a range position signal 21 that indicates an achieved range position of the transmission 14. Other signals provided in conjunction with the range position signal preferably include transmission clutch capacity, torque converter rotational speed and others indicating transmission state of operation. The ETRS system 20 includes pressure control valves, solenoids, servo-motors, valves, feedback sensors, and other elements to manipulate flow of pressurized fluid in the transmission 14 to shift the transmission range and facilitate operation of the transmission 14 in the operator-selected transmission range 55 indicated by the PRND signal 17. Other configurations of a powertrain system that include an operator selected transmission range, shifting of the transmission range and monitoring the achieved range position of the transmission may be employed within the scope of this disclosure.

The transmission range selector 16 and the ETRS system 20 connect to the TCM 18 to communicate therewith when employed on a vehicle. The TCM 18 and related terms including control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communications between controllers and between controllers, actuators and/or sensors may be accomplished using a direct wired link, a networked communications bus link, a wireless link or another suitable communications link. Communications include exchanging data signals in any suitable form, including, for example, electrical signals via a conductive medium, electromagnetic signals via air, optical signals via optical waveguides, and the like. The term 'model' refers to a processor-based or processor-executable code and associated calibration that simulates a physical existence of a device or a physical process.

Figure 2:
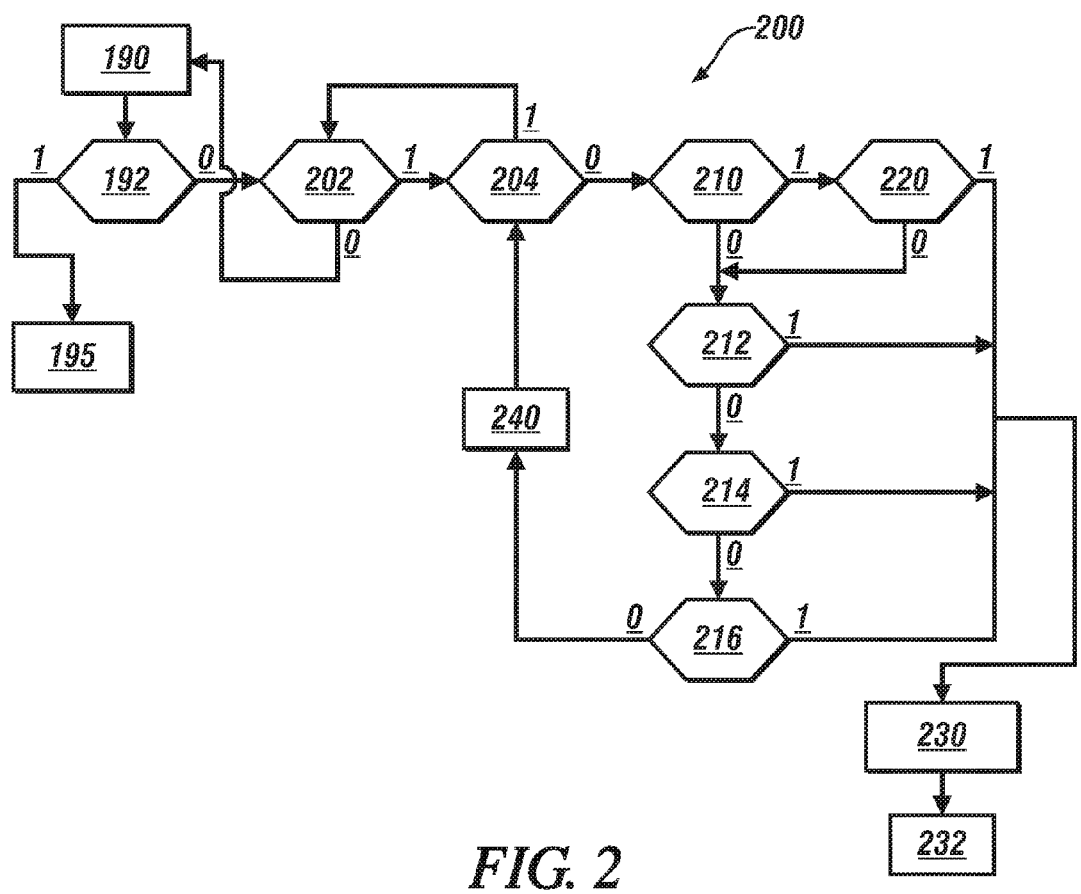
FIG. 2 schematically shows a transmission range selection monitoring routine for monitoring operation of an embodiment of a transmission range selector and associated electronic transmission range selection system employed on an embodiment of the powertrain system described with reference to FIG. 1, in accordance with the disclosure.

FIG. 2 schematically shows a transmission range selection monitoring (TRS) routine 200 for monitoring operation of an embodiment of the transmission range selector 16 and associated ETRS system 20, which can be employed on an embodiment of the powertrain system 10 described with reference to FIG. 1. The TRS routine 200 monitors operation of the transmission 14 to verify whether it is operating in a manner that is consistent with an operator's intentions as communicated to the transmission 14 through the transmission range selector 16. This includes monitoring one or more metrics associated with the transmission range selector 16. As used herein, a metric is defined as a standard of measurement that is employed to gauge a physical property or condition. One physical property includes elapsed time in one of the transmission ranges. The TRS routine 200 is implemented as one or more algorithms and calibrations in the TCM 18. Table 1 is provided as a key wherein the numerically labeled blocks and the corresponding functions are set forth as follows, corresponding to the TRS routine 200.

TABLE 1

| BLOCK | BLOCK CONTENTS |
|---|---|
| 190 | Monitor transmission range selector |
| 192 | Is an unexpected change in transmission range detected? |
| 195 | Detect transmission range fault; execute default action |
| 202 | Has operator requested transmission range change? |
| 204 | Is target transmission range change achieved? |
| 210 | Is target transmission range = Park? |
| 212 | Monitor transmission incorrect direction metric; is metric associated with transmission direction violated? |
| 214 | Monitor transmission unintended propulsion metric; is metric associated with unintended propulsion violated? |
| 216 | Monitor elapsed time metric associated with achieving target transmission range; is time limit associated with achieving target range exceeded? |
| 220 | Is Park engagement time limit exceeded? |
| 230 | Detect transmission range fault |
| 232 | Execute default action |
| 240 | Indicate absence of a fault with the transmission range selector |

The TRS routine (TRS routine) 200 preferably executes periodically, e.g., once per 100 ms or at another suitable execution period to determine whether the transmission range selector 16 and associated ETRS system 20 are operating as intended. Alternatively, the TRS routine 200 may execute in response to a trigger event, which can be a change in signal input from the transmission range selector 16.

The TRS routine 200 operates by monitoring signal input from the transmission range selector 16 (190) and determining whether an unexpected change in the transmission range has been detected (192). An unexpected change in the transmission range can include any change in output from the ETRS system 20, i.e., a change in the range position signal 21 from the transmission range mode valve position sensor 22 that is not in response to a signal input from the transmission range selector 16. Alternatively, an unexpected change in the transmission range may include an unexpected clutch torque capacity as indicated by the TCM 18, detected by pressure and or transmission rotational speed sensors. This can include employing the pressure and or transmission rotational speed sensors to monitor transmission torque capacity direction. If an unexpected change is detected (192)(1), a transmission range fault is detected and some form of default action is executed (195), with such default action including acting to prevent unintended vehicle acceleration or deceleration, including acceleration in an incorrect direction of travel. If no unexpected change is detected (192)(0), the routine proceeds to determine whether the operator has requested a transmission range change (202). On a system employing selectable transmission ranges that include Park, Reverse, Neutral and Drive (PRND), a requested change in the transmission range includes a P to R request, a P to D request, an R to D request, an N to D request, an N to R request and other requested transmission range changes.

When the operator has requested a transmission range change (202)(1), the ETRS system 20 and the transmission 14 are evaluated to determine whether the requested or target transmission range has been achieved (204). Evaluating the ETRS system 20 and the transmission 14 to determine whether the requested or target transmission range has been achieved includes monitoring position of the range position signal 21 from the transmission range mode valve position sensor 22, monitoring torque converter speed and clutch capacity or another suitable monitoring routine. This also includes monitoring parameters associated with the ETRS system 20 and the transmission 14, including transmission rotational direction, transmission propulsion, and transmission range. This also includes monitoring elapsed times, including monitoring an elapsed time that starts when the transmission range change is requested and ends, if at all, when the target transmission range is achieved.

When the ETRS system 20 and/or the transmission 14 indicate that the requested or target transmission range has been achieved (204)(1), no further action is required. This iteration of the TRS routine 200 ends, and returns to monitoring for an unexpected change as well as monitoring the signal input from the transmission range selector 16 to determine whether the operator has requested a transmission range change (202). Thus, if the operator requests another transmission range change, the latest transmission range request can be evaluated immediately.

When the ETRS system 20 and/or the transmission 14 indicate that the requested or target transmission range has not been achieved (204)(0), it is determined whether the target transmission range is Park (210).

When the target transmission range is Park (210)(1), the routine 200 determines whether a Park engagement time limit is exceeded (220). In one embodiment, the Park engagement time limit is less than 800 ms. The Park engagement time is determined based upon an elapsed time starting when the operator requests a transmission range change to Park via the transmission range selector 16. The elapsed time ends if and only when Park is achieved in the transmission 14, which can be indicated by a sensor 28 on the transmission 14 or the ETRS system 20 that monitors a Park pawl or another internal transmission device that is capable of positively detecting a non-slip engagement in the Park range. When the elapsed time associated with Park engagement exceeds the Park engagement time limit (220)(1), a fault in the ETRS is indicated (230) and default action is executed (232). Default action preferably includes notifying the operator using any suitable on-vehicle communications system, including but not limited to illuminating a malfunction indicator lamp, sending an audible and/or displayed message through a vehicle infotainment system, and securing the vehicle with other mechanisms to prevent vehicle movement.

When the elapsed time associated with Park engagement does not exceed the Park engagement time limit during this iteration (220)(0), the routine 200 monitors a transmission incorrect direction metric (212). Monitoring the transmission incorrect direction metric includes identifying situations where the transmission 14 is providing propulsion in the direction opposite of that which was requested by the driver. This includes providing Reverse propulsion when the target range was Drive and providing Drive propulsion when the target range was Reverse. The propulsion state of the transmission is determined by monitoring position of the range position signal 21 from the transmission range mode valve position sensor 22, monitoring torque converter speed using transmission rotational speed sensors and clutch capacity using pressure sensors or another suitable monitoring routine to predict the rotational direction of the transmission output shaft when the vehicle begins to move provided the vehicle is stationary. Provided the vehicle is moving, monitoring the transmission incorrect direction metric may also include monitoring actual rotational direction of the output member 15 of the transmission 14 and comparing the monitored rotational direction of the output member 15 with an expected rotational direction of the output member 15 that is determined based upon the target transmission range as indicated by the transmission range selector 16 (212). The expected rotational direction of the output member 15 is determined based upon the PRND signal 17 indicating the selected one of the operator-selectable transmission ranges that include Park, Reverse, Neutral and Drive (PRND) and input from the transmission range mode valve position sensor 22 in the form of the range position signal 21 indicating the achieved transmission range. The monitored rotational direction of the output member 15 may also be determined based upon an input from the ETRS system 20 or another sensor input that indicates monitored rotational direction of the output member 15, such as a Hall-effect or other suitable rotational speed sensor 24 that signally connects to the TCM 18 and monitors rotational speed of the output member 15. The monitored rotational direction of the output member 15 may also be determined employing clutch control feedback and other signals indicating transmission operation including transmission clutch capacity and torque converter rotational speed.

When the monitored or predicted rotational direction of the output member 15 fails to match the expected rotational direction of the output member 15 for greater than the predetermined elapsed incorrect direction time metric (212)(1), a fault in the ETRS 20 is indicated (230) and default action is executed as described herein (232). The predetermined elapsed period of time is in the order of magnitude of 500 ms in one embodiment. The monitored or predicted rotational direction of the output member 15 fails to match the expected rotational direction of the output member 15 when the monitored or predicted rotational direction indicates the Drive range and the expected rotational direction indicates the Reverse range, when the monitored or predicted rotational direction indicates the Reverse range and the expected rotational direction indicates the Drive range, and others.

When the monitored rotational direction of the output member 15 matches the expected rotational direction of the output member 15 (212)(0), the routine 200 monitors a transmission unintended propulsion metric (214). Monitoring the transmission unintended propulsion metric includes identifying situations where the transmission 14 is providing propulsion when the driver has requested the absence of propulsion. This includes providing Reverse propulsion when the target range was Neutral, providing Reverse propulsion when the target range was Park, providing Drive propulsion when the target range was Neutral or providing Drive propulsion when the target range was Park. The propulsion state of the transmission is determined by monitoring position of the range position signal 21 from the transmission range mode valve position sensor 22, monitoring torque converter speed and clutch capacity or another suitable monitoring routine. Propulsion relates to transfer of mechanical power in the form of torque and speed between a prime mover and a driveline, and a parameter associated with the expected propulsion can be determined based upon the selected one of the operator-selectable transmission ranges that include Park, Reverse, Neutral and Drive (PRND). Other parameters associated with the actual propulsion of the transmission which may be monitored to detect an unintended propulsion situation may include an input from a sensor on the transmission 14 or the ETRS 20 that monitors torque or rotation of the output member 15, or clutch torque capacity of the transmission clutches or another suitable torque monitor. The clutch torque capacity may be monitored by monitoring hydraulic clutch pressure in the transmission 14 using a pressure sensor 26, or transmission rotational speed sensors, or another suitable monitor.

When the actual propulsion from the transmission 14 does not match the expected absence of propulsion from the transmission 14 for the predetermined elapsed period of time (214)(0), a fault in the ETRS 20 is indicated (230) and default action is executed (232). The actual propulsion from the transmission 14 does not match the expected propulsion from the transmission 14 when the actual propulsion from the transmission 14 indicates propulsion, e.g., forward or reverse propulsion output from the transmission 14, and the expected propulsion from the transmission 14 indicates no propulsion, e.g., either Park or Neutral.

Each of the foregoing steps 210, 212 and 214 are described as executing in a sequential fashion. However, it is appreciated that these steps can be executed in any suitable order, or executed concurrently.

When the actual propulsion from the transmission 14 matches the expected propulsion from the transmission 14 (214)(1), the routine 200 determines whether a time metric associated with achieving a target transmission range has exceeded a maximum time limit by monitoring the elapsed time that starts when the transmission range change is requested and ends, if at all, when the target transmission range is achieved (216). When the elapsed time for achieving the target transmission range exceeds the maximum time limit (216)(1), a fault in the ETRS 20 is indicated as described herein (230) and default action is executed (232). When the elapsed time for achieving the target transmission range has not exceeded the maximum time limit (216)(1) and the control routine 200 indicates absence of a fault with the transmission range selector (240), this iteration of the routine 200 ends. Information indicating absence of a fault with the ETRS system 20 may be used by the TCM 18 or another controller in determining a root cause of another fault in the transmission 14 by eliminating the ETRS 20 as a potential source or cause of another fault. The ETRS system 20 and the transmission 14 are again evaluated to determine whether the requested or target transmission range has been achieved (204).

The maximum time limit is determined in relation to the present transmission range and the target transmission range. In a system employing a sequential progression of the transmission ranges that includes Park, Reverse, Neutral, and Drive, the TRS routine 200 may include time metrics associated with each of the transitions, including, e.g., Park to Drive, Reverse to Drive, Drive to Reverse, Reverse to Park, Park to Reverse, Drive to Park, Park to Neutral, Reverse to Neutral, Drive to Neutral, Neutral to Drive, Neutral to Reverse and Neutral to Park.

There can be multiple time limits associated with a transition to a target range that occurs across two or more ranges, e.g., from Park to Drive through Reverse and Neutral, with the time limits associated with the different transitions. By way of example, a commanded transition from Drive to Park through Neutral and Reverse preferably includes the Park engagement time limit (Step 210), which is less than 800 ms in one embodiment, and an unintended propulsion metric associated with a transition from Drive to Park (Step 214), which is less than 200 ms in one embodiment. By way of example, in another scenario wherein a transition from Drive to Reverse is commanded, preferably includes an incorrect direction metric (Step 212) associated with the transition through Reverse, which is less than 200 ms in one embodiment and the range achievement metric (Step 216), associated with the transition from Drive to Reverse, which is less than 2000 ms in one embodiment. Thus, the TRS routine 200 can permit flexibility in selecting the calibrated time limits, monitoring for the tightest limits only when necessary during the transition, thus allowing for system variation, aging, wear, latencies associated with signal communications and actuator lag times.

The TRS routine 200 is intended to timely detect a fault in the ETRS 20 and other related components while minimizing likelihood of false detection of a fault therein. It includes a concise, unambiguous routine that actively adjusts diagnostic thresholds to minimize risk of false fault while ensuring metrics are enforced. Such metrics may include preventing unintended propulsion and preventing an incorrect direction of travel. Thus, monitoring a transmission range mode valve position sensor, transmission turbine speed, achieved clutch capacity and other such indicators of achieved range of the transmission can be employed to detect and prevent unintended propulsion and incorrect direction hazard events. An unintended propulsion hazard is defined as a condition in which the transmission provides propulsion when the driver intended otherwise. An incorrect direction hazard includes a condition in which the transmission provides Reverse propulsion when the driver requests Drive propulsion or the transmission provides Drive propulsion when the driver requests Reverse propulsion.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for monitoring a transmission range selector connected to a transmission of a powertrain system, wherein the transmission range selector indicates one of a plurality of ranges including Park, Reverse, Neutral, and Drive, the method comprising:
   upon detecting a change in a target transmission range, monitoring, via a controller, whether a signal output from an on-board sensor indicates an achieved range position of the transmission, wherein detecting a change in a target transmission range includes detecting one of a change from Park to Reverse, Park to Neutral, Park to Drive, Reverse to Park, Reverse to Neutral, Reverse to Drive, Drive to Park, Drive to Reverse or Drive to Neutral; and
   when the signal output from the on-board sensor does not indicate that the target transmission range has been achieved:
      monitoring a transmission incorrect direction metric,
      monitoring a transmission unintended propulsion metric, and
      monitoring an elapsed time metric associated with achieving the target transmission range; and
   detecting a fault when any one of the transmission incorrect direction metric, the transmission unintended propulsion metric and the elapsed time metric is exceeded.

2. The method of claim 1, further comprising monitoring an engagement time associated with achieving the Park range upon detecting a change in the target transmission range to the Park range, wherein achieving the Park range is detected by a sensor monitoring a positive, non-slip engagement of the transmission in the Park range and detecting a fault when the engagement time exceeds a threshold.

3. The method of claim 1, wherein monitoring a transmission incorrect direction metric further comprises monitoring transmission torque capacity direction employing one of a transmission range mode valve position sensor, a transmission rotational speed sensor and a pressure sensor, and comparing the transmission torque capacity direction with an expected rotational direction of the output member determined based upon the target transmission range as indicated by the transmission range selector.

4. The method of claim 1, wherein monitoring a transmission unintended propulsion metric comprises monitoring a parameter associated with actual propulsion from the transmission and comparing the actual propulsion with an expected propulsion.

5. The method of claim 4, wherein monitoring a parameter associated with actual propulsion from the transmission comprises monitoring a clutch torque capacity of transmission clutches.

6. The method of claim 1, further comprising detecting absence of a fault with the transmission range selector when the transmission incorrect direction metric, the transmission unintended propulsion metric and the elapsed time metric are within expected ranges.

7. The method of claim 1, wherein monitoring whether a signal output from an on-board sensor indicates an achieved range position of the transmission comprises monitoring whether a signal output from one of a transmission range mode valve position sensor, a transmission rotational speed sensor and a pressure sensor indicate an achieved range position of the transmission.

8. A method for monitoring an operator-requested direction of vehicle travel and a transmission range selector connected to a transmission of a powertrain system, wherein the transmission range selector indicates one of a plurality of ranges including Park, Reverse, Neutral, and Drive, the method comprising:
 upon detecting an expected change in the operator-requested direction of vehicle travel:
 monitoring a signal output from a transmission range mode valve position sensor of the transmission for determining if an achieved transmission range is indicated;
 monitoring a transmission incorrect direction metric, a transmission unintended propulsion metric, and an elapsed time metric associated with achieving the target transmission range;
 monitoring an engagement time associated with achieving the Park range upon detecting a change in the target transmission range to the Park range, wherein achieving the Park range is detectable by a sensor monitoring engagement of the transmission in the Park range; and
 detecting a fault when any one of the transmission incorrect direction metric, the transmission unintended propulsion metric and the elapsed time metric is exceeded when the signal output from the transmission range mode valve position sensor fails to indicate the target transmission range has been achieved, and detecting a fault when the engagement time exceeds a threshold.

9. The method of claim 8, wherein monitoring a transmission incorrect direction metric further comprises monitoring one of a transmission range mode valve position sensor, a transmission rotational speed sensor and a pressure sensor to determine a transmission torque capacity direction, and comparing the transmission torque capacity direction with an expected rotational direction of an output member of the transmission that is determined based upon the target transmission range as indicated by the transmission range selector.

10. The method of claim 8, wherein monitoring a transmission unintended propulsion metric comprises monitoring a parameter associated with actual propulsion from the transmission and comparing the actual propulsion with an expected propulsion.

11. The method of claim 10, wherein monitoring a parameter associated with actual propulsion from the transmission comprises monitoring a clutch torque capacity of transmission clutches.

12. The method of claim 8, further comprising detecting absence of a fault with the transmission range selector when the transmission incorrect direction metric, the transmission unintended propulsion metric and the elapsed time metric are within expected ranges.

13. A transmission for a powertrain system, comprising:
 a transmission range selector indicating one of a plurality of operator-selectable ranges including Park, Reverse, Neutral, and Drive
 an electronic transmission range selection system controlling operation of the transmission in one of the operator-selectable ranges;
 a transmission range mode valve position sensor monitoring an achieved range position of the transmission;
 a rotational speed sensor monitoring a rotational direction of an output member of the transmission;
 a rotational speed sensor monitoring transmission clutch capacity;
 a sensor monitoring a positive, non-slip engagement of the transmission in the Park range;
 a sensor monitoring a parameter associated with actual propulsion from the transmission; and
 a controller executing a control routine including:
 upon detecting a change in a target transmission range, monitoring a signal output from the transmission range mode valve position sensor; and
 when the signal output from the transmission range mode valve position sensor fails to indicate the target transmission range has been achieved:
 monitoring a transmission incorrect direction metric, a transmission unintended propulsion metric, and an elapsed time metric associated with achieving the target transmission range, and
 detecting a fault in the transmission when any one of the transmission incorrect direction metric, the transmission unintended propulsion metric and the elapsed time metric is exceeded.

14. The transmission of claim 13, further comprising the control routine including monitoring an engagement time associated with achieving the Park range upon detecting a change in the target transmission range to the Park range, wherein achieving the Park range is detected by the sensor monitoring the positive, non-slip engagement of the transmission in the Park range, and detecting a fault when the engagement time exceeds a threshold.

15. The transmission of claim 13, further comprising the control routine detecting absence of a fault with the transmission range selector when the transmission incorrect direction metric, the transmission unintended propulsion metric and the elapsed time metric are within expected ranges.

* * * * *